United States Patent [19]
Saito et al.

[11] Patent Number: 5,758,214
[45] Date of Patent: May 26, 1998

[54] CAMERA WITH SETTING/FILM FEED SWITCH

[75] Inventors: Tatsuo Saito; Shigenori Goto, both of Omiya, Japan

[73] Assignee: Fuji Photo Optical Co., Ltd., Omiya, Japan

[21] Appl. No.: 674,576

[22] Filed: Jun. 28, 1996

[30] Foreign Application Priority Data

Jun. 29, 1995 [JP] Japan ................... 7-163943

[51] Int. Cl.⁶ ........................... G03B 17/00
[52] U.S. Cl. ............... 396/299; 396/418; 396/536
[58] Field of Search ........................... 396/297, 299, 396/387, 411, 415, 418, 536, 543

[56] References Cited

U.S. PATENT DOCUMENTS 5,005,033  4/1991  Miyasaka .................. 396/299
5,136,313  8/1992  Muramatsu et al. .......... 396/415

*Primary Examiner*—Howard B. Blankenship
*Attorney, Agent, or Firm*—Sixbey, Friedman, Leedom & Ferguson; David S. Safran

[57] ABSTRACT

An UP/DOWN dial is used with at least one of switches including a back cover switch detecting whether the cover switch of the camera is opened or closed, so as to also serve as a switch for driving a feed motor by the manual operation. As a result, the number of switches can be reduced. That is, the switch for driving the feed motor by the manual operation is used only when the film is set in the camera (only when the back cover opens). Therefore, if the cover switch detects that the back cover opens, the UP/DOWN dial is operated regardless of the currently-set mode, so that the feed motor can be driven.

9 Claims, 4 Drawing Sheets

CAMERA WITH SETTING/FILM FEED SWITCH

BACKGROUND OF THE INVENTION

1. Field of the Invention

The present invention relates to a camera, and more particularly to a camera which uses Brownie film.

2. Description of the Related Art

A camera, which uses Brownie film (120 or 220 roll film), is frequently used by professionals and semiprofessionals. This camera has a function for the user to manually set the photographing conditions such as a stop value, an exposure correction, a shutter speed, a subject distance, or the like. Some cameras are provided with an automatic film feeding mechanism, which feeds a roll of film one frame by driving a windup reel by a feed motor before the photographing of one frame is completed.

Since perforations are not spaced on the Brownie film, a leader paper at the tip of the Brownie film (120 or 220 roll film) is inserted into the windup reel. Then, the windup reel is rotated several times so that the leader paper can be wound around the windup reel. Therefore, the camera of this type is not provided with an automatic film feeding mechanism for automatically winding the Brownie film around the windup reel. When the Brownie film is set in the camera, a switch for driving the feed motor needs to be operated in order to rotate the windup reel appropriately, so that it can be confirmed whether the leader paper of the Brownie film has been wound around the windup reel properly.

There is another problem in that the number of switches are increased if the above-mentioned switch, which is used only when the Brownie film is wound around the windup reel, is provided.

SUMMARY OF THE INVENTION

The present invention has been developed in view of the above-described circumstances, and has its object the provision of a camera wherein at least a switch, which is used for driving a feed motor when the film is wound, and also serves as a setting switch for setting the photographing conditions such as an aperture value, a shutter speed, etc., so that the number of switches can be reduced.

In order to achieve the above-mentioned object, the present invention comprises: a set switch which is used with one switch or a plurality of switches including a cover switch detecting whether a back cover of the camera is opened or closed and sets photographing conditions of the camera; a film supply part provided with a film supply part where a roll of film is set and a film windup part which drives a windup reel by a feed motor for winding up the roll of film set in the film supply part, and controlling the feed motor so that the roll of film can feed one frame at least every time the photographing is completed; and a control means for driving the feed motor when the back cover switch detects that the back cover of the camera opens and the set switch is operated.

According to the present invention, the set switch for setting the photographing conditions of the camera is used with one or more of switches including a back cover switch, which detects whether the back cover of the camera opens or closes, so as to also serve as a switch for driving the feed motor by a manual operation. As a result, the number of switches is reduced. That is, the switch for driving the feed motor by a manual operation is used only when the film is set in the camera (only when the back cover opens).

Therefore, when the back cover switch detects that the back cover of the camera opens, the set switch is operated regardless of the currently set mode so that the feed motor can be driven.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
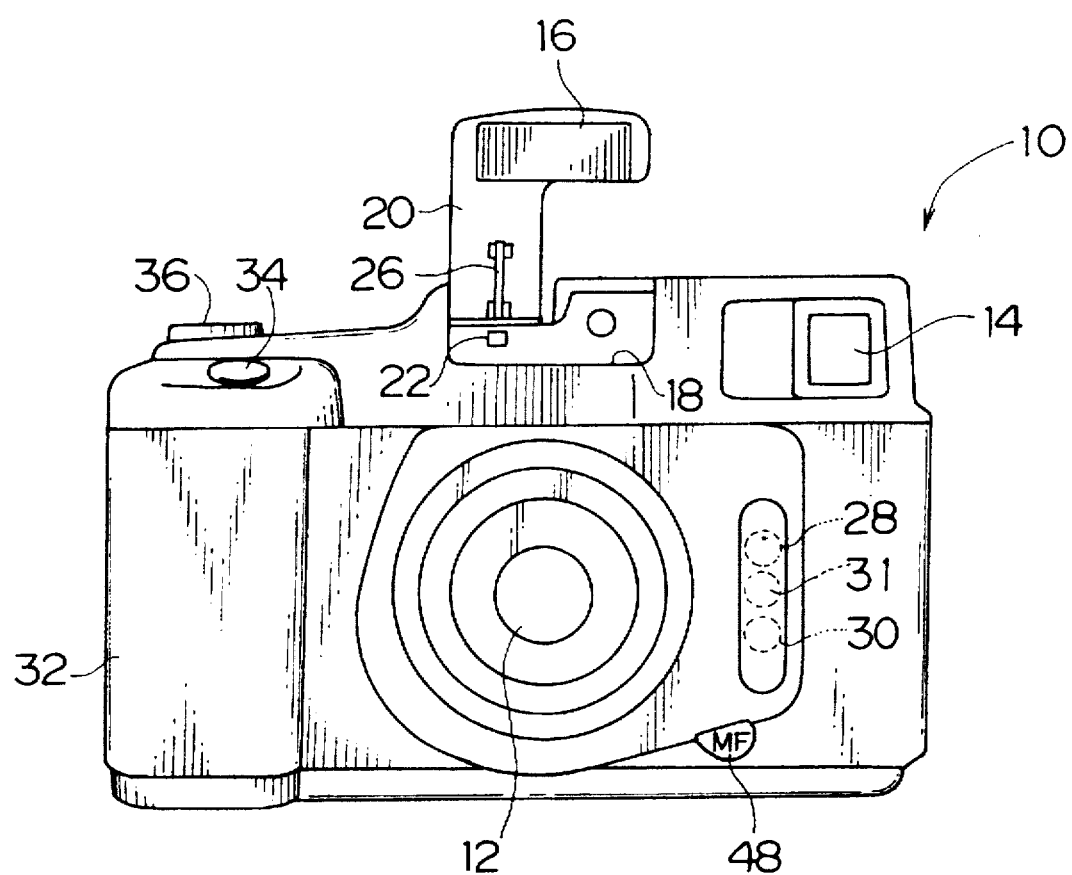
FIG. 1 is a front elevation of a camera, to which the present invention is applied.
Figure 2:
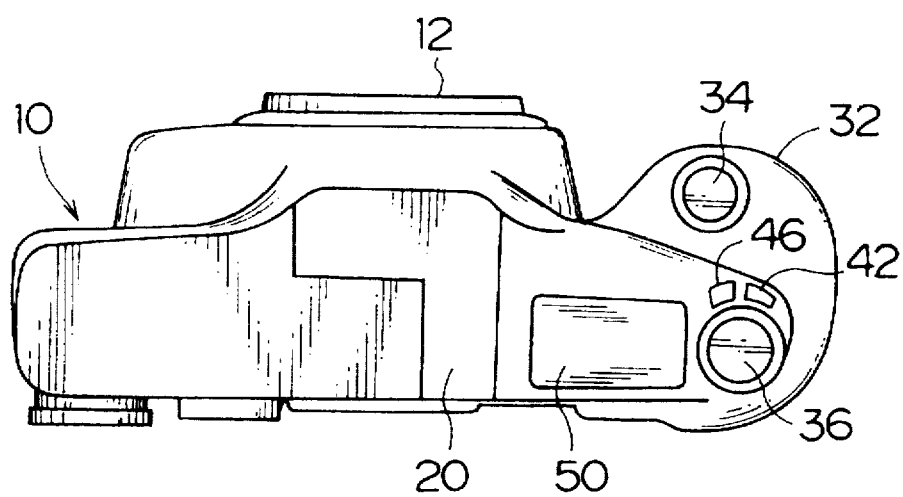
FIG. 2 is a top view of a camera, to which the present invention is applied.
Figure 3:
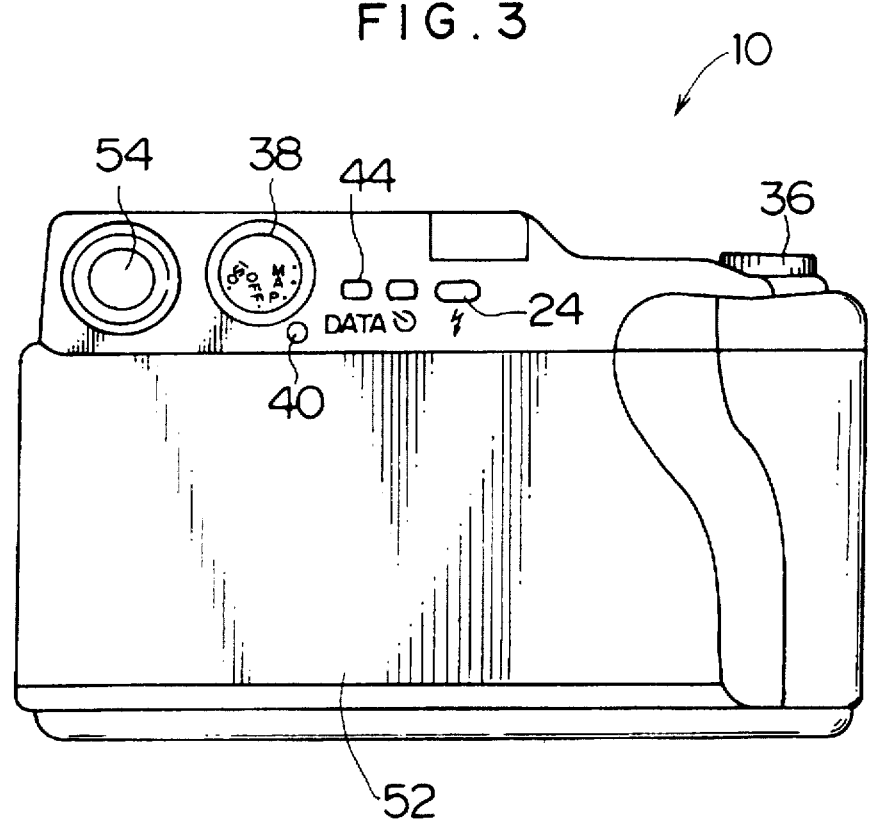
FIG. 3 is a rear elevation of a camera, to which the present invention is applied.

FIGS. 1, 2 and 3 are a front elevation, a top view, and a rear elevation, respectively, of a camera to which the present invention is applied.

The camera in the drawing uses Brownie film. A taking lens 12 is arranged at a substantially central part on the front surface of a camera's main body 10 as shown in FIG. 1. An illuminated finder 14 is arranged at the upper right corner with regard to the taking lens 12 in the drawing. Incidentally, in FIG. 3, the number 54 indicates an eyepiece of the finder 14.

A strobe flash part 16 is arranged above the taking lens 12, and is attached to a concave portion 18, which is formed on the top of the camera's main body 10. The strobe flash part 16 projects from and withdraws to the concave portion 18. When the strobe flash part 16 is stored in the concave portion 18, an engagement groove (not shown), which is formed at an arm 20 in the strobe flash part 16, is engaged with a nail 22 positioned in the concave portion 18. As a result, the strobe flash part can be held in a state of being stored in the concave portion. If a lock release button 24, which is provided at the back of the camera's main body in FIG. 3, is depressed, the engagement is released. As a result, the strobe flash part 16 projects from the concave portion 18 because the force is applied by a member (not shown), and then the strobe flash part 16 is held at a position as shown in FIG. 1. The rigidity of the arm 20 projecting from the concave portion 18 is improved by a link mechanism 26.

An AE light projector 28, an AF light acceptor 30, and an AE light acceptor 31 are arranged close to each other on the right side of the taking lens 12 in the drawing. Further, a grip part 32 is formed on the left side of the camera's main body 10. A shutter button 34 is arranged at the top of the grip part 32.

As shown in FIGS. 1 and 2, an UP/DOWN dial 36 is arranged close to the shutter button 34. The UP/DOWN dial 36 is a dial switch, which can rotate in forward and backward directions, and transmits a signal indicating 14 rotational positions per rotation. The UP/DOWN dial 36 is operated when the photographing conditions such as an aperture value, an exposure correction, a shutter speed, a subject distance, an ISO sensitivity, a date, etc. are set, and when the Brownie film is set in the camera (when the leader paper is wound around a windup reel 45 (FIG. 4)).

That is, the UP/DOWN dial 36 is combined with a select dial, which is provided at the back of the camera's main body 10 in FIG. 3, an exposure correction button 42, an AF button 46 for changing over an automatic focusing mode (AF mode) and a manual focusing mode (MF mode), a back cover switch 41 for detecting whether a back cover 52 opens or not (see FIG. 4), a DATA button 44 for picking up the photographic data in an area outside the photographic area of the film, and an MF button (see FIG. 1), so as to perform various kinds of processes.

TABLE 1

| COVER SW | SELECT DIAL | AF BUTTON (AF/MF) | OTHER SWITCH | PERFORMANCE |
|---|---|---|---|---|
| open | — | — |  | Feed Motor is Driven |
| close | ISO | — |  | ISO Speed is Set |
| close | A,M | — |  | Aperture is Set |
| close | P,A | — | Exposure Correction Button ON | EV is Corrected |
| close | M | — | Exposure Correction Button ON | Shutter Speed is Set |
| close | P,A,M | — | DATA Button ON | Date is Set |
| close | P,A,M | MF | MF Button ON | Distance is Set |

If a select button 40 is depressed, the lock of the select dial 38 is released so as to rotate. The select dial 38 selects one of the modes "M", "A", "P", "OFF", and "ISO". A manual exposure, an aperture priority automatic exposure, a program automatic exposure, and an ISO speed are set in the modes "M", "A", "P", and "ISO", respectively. The select dial 38 also serves as a power source switch, and turns off a main power source of the camera when "OFF" is selected.

Figure 4:
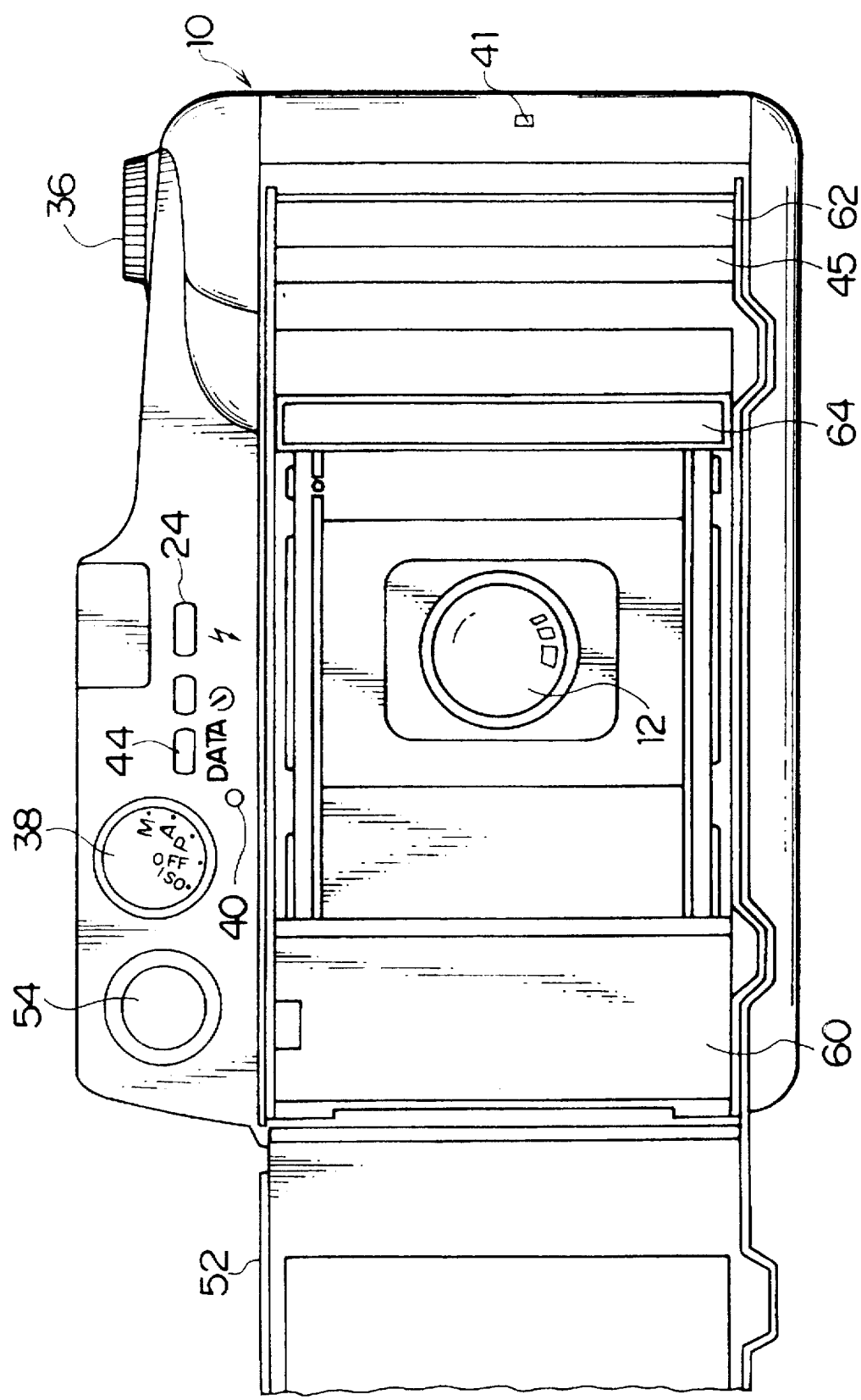
FIG. 4 is a rear elevation showing a state that a back cover is opened in a camera, to which the present invention is applied.

If the UP/DOWN dial 36 is operated when the cover switch 41 detects that the cover 52 is opened as shown in the table 1, the UP/DOWN dial 36 drives the feed motor in accordance with the operation regardless of the currently-set mode. That is, every time the UP/DOWN signal outputs a signal indicating each rotational position, the feed motor is rotated by a predetermined angle, and a windup reel 45 is rotated by a predetermined angle. The camera has a film supply part 60 where the Brownie film is set as shown in FIG. 4, a film windup part 62 for winding up the brownie film set in the film supply part 60 by rotating the windup reel 45, and a control means (not shown) for controlling the feed motor so that the Brownie film is fed by one frame every time the photographing is completed and for controlling the feed motor when the first frame of the film is set and when the film is wound up after the photographing of all the frames is completed. Incidentally, a length, wherein the film is fed when the feeding of one frame is controlled, is detected by a rotational angle of a roller 64, which rotates interlocking with the feeding film.

When the Brownie film is set in the camera, the cover 52 is opened so that the Brownie film can be stored in the film supply part 60. Then, the leader paper of the Brownie film is inserted into the windup reel 45, and the windup reel 45 is rotated in a windup direction until it is confirmed that the leader paper has been wound around the windup reel 45. When the feed motor drives the windup reel 45, the UP/DOWN dial 36 is operated.

On the other hand, if the cover switch 41 detects that the cover is closed, the function of the UP/DOWN dial 36 is specified by a combination of the select dial 38, the AF button 46, and other switches.

That is, if the mode "ISO" is selected by the select dial, the UP/DOWN dial is operated so that the ISO speed can be set. Incidentally, what has been set is displayed on an LCD panel 50 (see FIG. 2), which is arranged close to the UP/DOWN dial 36.

If the mode "A" or "M" is selected by the select dial 38, the UP/DOWN dial 36 is operated so that the stop value can be set. If the mode "P" or "A" is selected by the select dial 38 and the exposure correction button 42 is turned on, the exposure can be corrected. An exposure value, which is automatically set in accordance with a photometry value by the operation of the up/down dial 36, is corrected every ½ step within the range of ±2EV.

If the mode "M" is selected by the select dial 38 and the exposure correction button 42 is turned on, the shutter speed can be set. The shutter speed is set by the operation of the UP/DOWN dial 36. If the mode "P", "A", or "M" is selected by the select dial 38 and the DATA button is turned on, the date can be set. If the UP/DOWN dial 36 is operated, the date when the data is photographed is set.

If the mode "P", "A" or "M" is selected by the select dial 38, the MF mode is selected by the AF button 46, and the MF button 48 is turned on; the distance is set in 14 levels, 0.7–∞ by the operation of the UP/DOWN dial 36. Incidentally, if the AF mode is selected by the AF button 46 and the MF button 48 is turned on in such a state that the focus is locked by the half depression of the shutter button 34, the focus point can be maintained even if a finger is removed from the shutter button 34.

Incidentally, the setting switch for setting the photographing conditions in the present invention is not limited to the UP/DOWN dial of this embodiment. For example, the set switch may be composed of an UP switch and a DOWN switch, or a seesaw switch and others.

As has been described above, according to the present invention, the switch, which drives the feed motor when the film is wound up, also serves as a switch for setting the photographing conditions such an aperture value, a shutter speed, etc. . Therefore, the number of switches can be reduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A camera comprising:
    a set switch used together with at least one of switches including a backcover switch detecting whether a back cover of the camera opens or closes so as to set photographing conditions of the camera;
    film feed means provided with a film supply part where a roll of film is set and a film windup part winding up the roll of film set in the film supply part by driving a windup real by a drive motor and controlling the drive motor so that the roll of film is fed one frame whenever a frame has been exposed; and
    control means for driving the drive motor when the back cover switch detects that the back cover of the camera opens and the set switch is operated.

2. A camera according to claim 1, wherein:
    the set switch is a dial switch rotatable in forward and backward directions, and means for outputting an instruction signal every time that the dial switch is rotated by a predetermined angle; and the control means controls the drive motor every time the control means receives the instruction signal so that the windup reel rotates by a predetermined angle.

3. The camera according to claim 1, wherein the photographing conditions of the camera include at least one of an aperture value, an exposure correction, a shutter speed, a subject distance, an ISO speed, and a date; and the set switch is a dial switch rotatable in forward and backward directions; and values in the photographing conditions are changed by the rotation.

4. The camera according to claim 3, wherein a select dial is provided for selecting one of an ISO speed setting, an aperture priority automatic exposure, a program automatic exposure, and a manual exposure; the back cover switch detects that the back cover closes; and when the ISO speed setting mode is selected by the select dial, the ISO speed is set based on the dial operation of the set switch.

5. The camera according to claim 3, further comprising a select dial for selecting one of an ISO speed setting, an aperture priority automatic exposure, a program automatic exposure, and a manual exposure; wherein the back cover switch detects that the back cover of the camera closes; and when the aperture priority automatic exposure or the manual exposure is selected by the select dial, the aperture is set based on the dial operation of the set switch.

6. The camera according to claim 3, further comprising a select dial for selecting one of an ISO speed setting, an aperture priority automatic exposure, a program automatic exposure, and a manual exposure, and an exposure correction button; wherein the back cover switch detects that the back cover of the camera closes; and when the exposure correction button is turned on, the shutter speed is set based on the dial operation of the set switch.

7. The camera according to claim 3, further comprising a select dial for selecting one of an aperture priority automatic exposure, a program automatic exposure, and a manual exposure, and an exposure correction button; wherein the back cover switch detects that the back cover of the camera closes, the manual exposure is selected by the select dial and the exposure correction button is turned on, the shutter speed is set based on the dial operation of the set switch.

8. A camera according to claim 3, further comprising a select dial for selecting one of an ISO speed setting, an aperture priority automatic exposure, a program automatic exposure, and a manual exposure, and a data switch; wherein the back cover switch detects that the back cover of the camera closes; and when the aperture priority automatic exposure, the program automatic exposure or the manual exposure is selected by the select dial and the data switch is turned on, the date is set based on the dial operation of the set switch.

9. The camera according to claim 3, further comprising: a select dial for selecting one of an ISO speed setting, an aperture priority automatic exposure, a program automatic exposure, and a manual exposure, an AF button for switching an auto-focus mode and a manual focus mode, and a distance set button; wherein the back cover switch detects that the back cover of the camera closes, the manual focus mode is selected by the AF button, and the distance set button is turned on, an object distance is set based on the dial operation of the set switch.

* * * * *